Oct. 18, 1966 S. E. TAYLOR 3,279,098
METHOD OF TEACHING
Filed March 16, 1964 4 Sheets-Sheet 1

INVENTOR.
STANFORD E. TAYLOR
BY
Kane, Dalsimer and Kane
ATTORNEYS

Oct. 18, 1966 S. E. TAYLOR 3,279,098
METHOD OF TEACHING
Filed March 16, 1964 4 Sheets-Sheet 2
*FIG. 2*
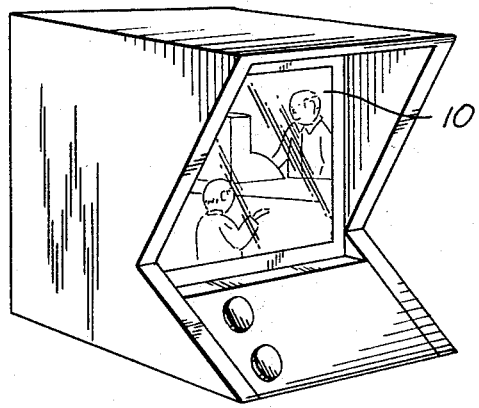
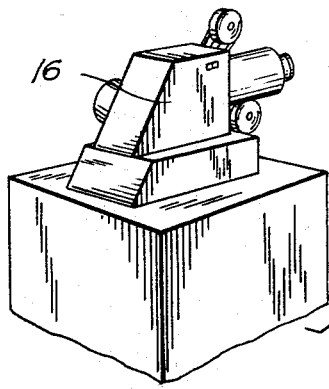
*FIG. 3*
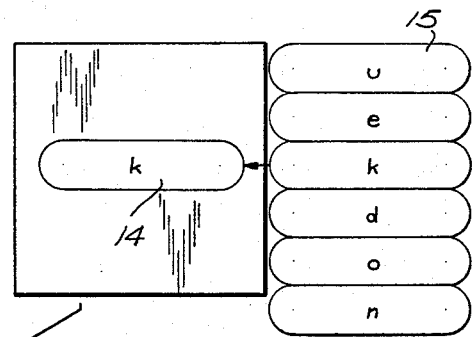
*FIG. 4*
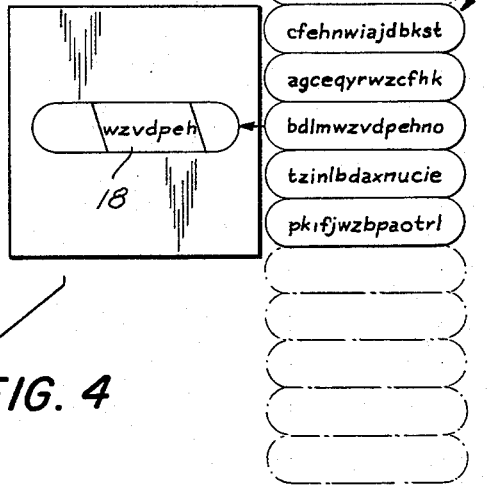
INVENTOR.
STANFORD E. TAYLOR
BY
Kane, Dalsimer and Kane
ATTORNEYS Oct. 18, 1966  S. E. TAYLOR  3,279,098
METHOD OF TEACHING
Filed March 16, 1964  4 Sheets-Sheet 3

FIG. 5

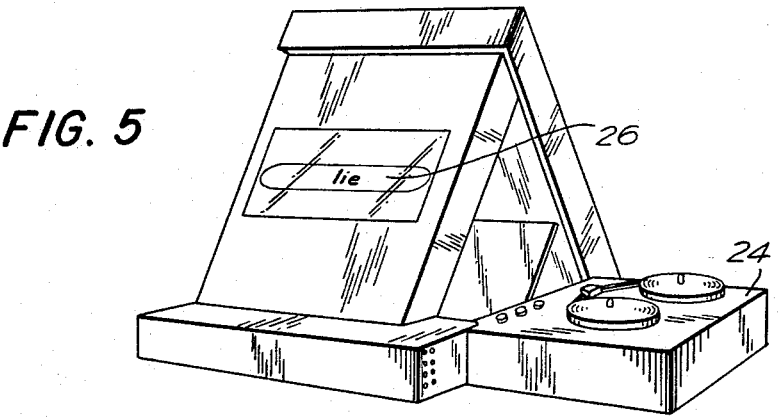

While you ..........lie on your bed at night in a room in your house with
        |  lie  | your ..........eyes tightly closed, animals in fields and forests, in lakes and
       | eyes | rivers are sleeping, too. Like you, they must ..........rest.
                                              | rest |

FIG. 6

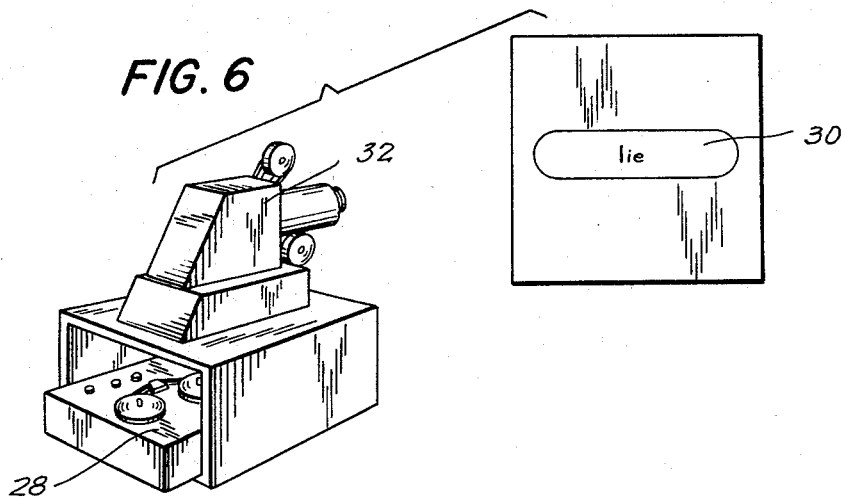

When he is tired, a horse may.............down and rest on his belly
                              |  lie  | or his side. But much of the time he.............standing up. He just
                                    | sleeps | closes his.............and dreams of whatever it is
          | eyes | that horses dream about.

INVENTOR.
STANFORD E. TAYLOR
BY
Kane, Dalsimer and Kane
ATTORNEYS

Oct. 18, 1966   S. E. TAYLOR   3,279,098
METHOD OF TEACHING
Filed March 16, 1964   4 Sheets-Sheet 4
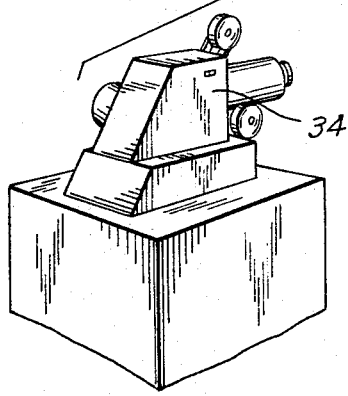
FIG. 7
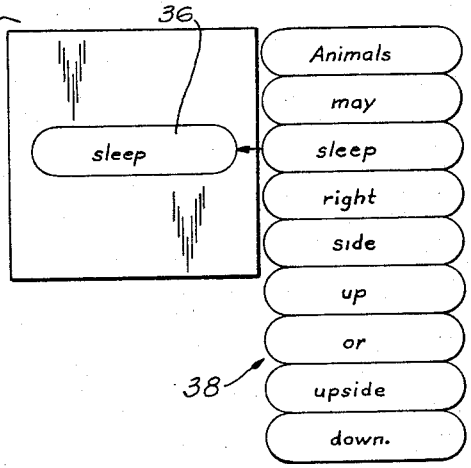
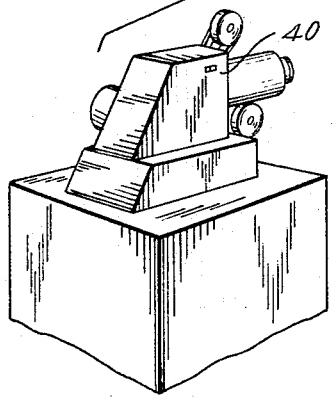
FIG. 8
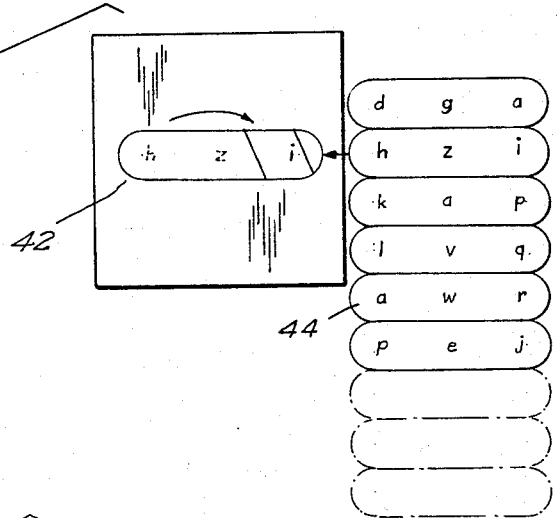
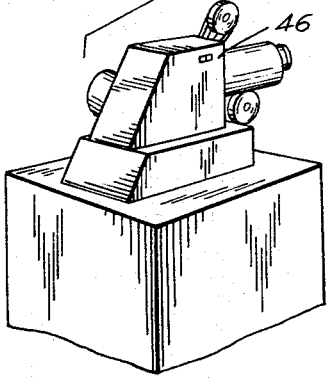
FIG. 9
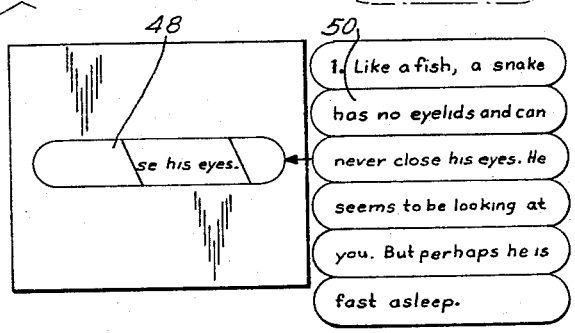
INVENTOR.
STANFORD E. TAYLOR
BY
Kane, Dalsimer and Kane
ATTORNEYS … # 3,279,098
METHOD OF TEACHING
Stanford E. Taylor, 284 Pulaski Road, Huntington, N.Y.
Filed Mar. 16, 1964, Ser. No. 351,903
1 Claim. (Cl. 35—35)

This invention relates to an improved method of teaching, and more particularly to an improved method of teaching linguistic skills using audio-visual aids.

Competence in linguistic skills, which includes reading, writing and verbal communication, is of basic importance in all educational fields. A student whose linguistic skills are inadequately developed is handicapped in all of his educational development and also later in life in his career. Teaching in the field of linguistic skills in the United States has been frequently criticized and has been the subject of considerable controversy, treatises, and discussions on "Why Johnny Can't Read."

It is a particular object of the present invention to provide an improved method of teaching linguistic skills utilizing audio-visual aids wherein the student's background and experiences and his existing communication abilities to speak and to listen are more completely capitalized on in an instructional program in which his discrimination between letters and letter sequences, and his recognition, identification, understanding and use of words and word sequences is more quickly developed and wherein his speed in the utilization of these skills in a reading-thinking act is readily increased and accelerated.

My improved method of teaching linguistic skills using audio-visual aids has the further advantage that:

(a) My method permits more inductive learning because of sound and sight synchronization in the use of audio-visual aids.

(b) My method permits separate training of individual component skills such as looking, listening, reading, and thinking.

(c) My method, to a great extent, is auto-instructional and therefore individualized and can thus be arranged so students can proceed at an individual pace.

(d) My method makes use of programmed instructional methods by providing for instruction in small steps combined with immediate reinforcement.

(e) My method utilizes audio-visual aids and instruments to a maximum and accordingly frees the teacher for more individualized pupil attention and supervision.

(f) My method provides through audio-visual methods more care in the manner in which individual linguistic skills are introduced and taught.

(g) My method provides for a more motivating learning experience which will command more attention and thus will reduce both the amount of relearning and drills required of the students.

(h) My method develops an improved listening ability by including instruction in more analytical listening skills.

(i) My method decreases the student's recognition time of printed words by providing improved means of associating words with meaning, by teaching the graphic nature of a word, and by instructing him by providing constant demonstrations of the relationship of spoken language with sentences, words, and word parts.

(j) My method develops efficient oculo-motor and perceptual habits and specifically discourages in a controlled manner the formation of the poor reading performance habits of regressing and rereading.

(k) My method provides for developing the reading-thinking act as a highly coordinated and efficient activity.

(l) My method provides richer communication experience for the child with more association, more mental activity and with a higher pace of learning.

In carrying out my method, after letter recognition and letter order have been taught, I contemplate presenting the sound of words in a linguistic sequence comprising at least a sentence and at intervals producing the visual image of certain selected words in the linguistic sequence in conjunction with the production of the sound of each selected word, by presenting the visual words immediately preceding the spoken word and continuing the image during the sound of each selected word, terminating the visual word precisely at the end of the sound of the word and thereby indirectly teach the relationships of aural vocabulary with printed words.

My method also contemplates further reinforcing word recognition by producing images of words in phonetically and graphically related groups, while simultaneously producing the sound of the word. In addition, my invention contemplates decreasing the identification and recognition time of words whose function and meaning has been taught by presenting timed tachistoscopic word exposures without the sound of the word at increasing rates of speed, shorter than the usual eye pause in reading. Furthermore, my invention contemplates decreasing the perceptual processing time of sight words by thereafter presenting the images of these words in a linguistic sequence, such as a sentence or paragraph, one word at a time and one word to a line, at increasing rates of speed on all words for less time than a usual eye pause in reading. Finally, my invention contemplates developing visual motility by displaying words, letters, or other symbols in a highly accelerated left-to-right manner in accordance with conventional reading performance patterns.

In the accompanying drawings:

FIG. 2 is a diagrammatic view in perspective of an audio-visual device which may be used in step or phase I of the sequence;

FIG. 3 is a diagrammatic view illustrating the use of a visual aid in connection with step or phase III of the sequence;

FIG. 4 is a diagrammatic view showing the use of a visual aid in connection with step or phase IV of the sequence;

FIG. 5 is a diagrammatic view illustrating the use of an audio-visual aid in connection with step or phase V of the sequence;

FIG. 6 is a diagrammatic view illustrating the use of an audio-visual aid in connection with step or phase VII of the sequence;

FIG. 7 is a diagrammatic view illustrating the use of a visual aid in connection with step or phase VIII of the sequence;

FIG. 8 is a diagrammatic view illustrating the use of a visual aid in connection with step or phase IX of the sequence; and FIG. 9 is a diagrammatic view illustrating the use of a visual aid in connection with step or phase X of this sequence.

Figure 1:
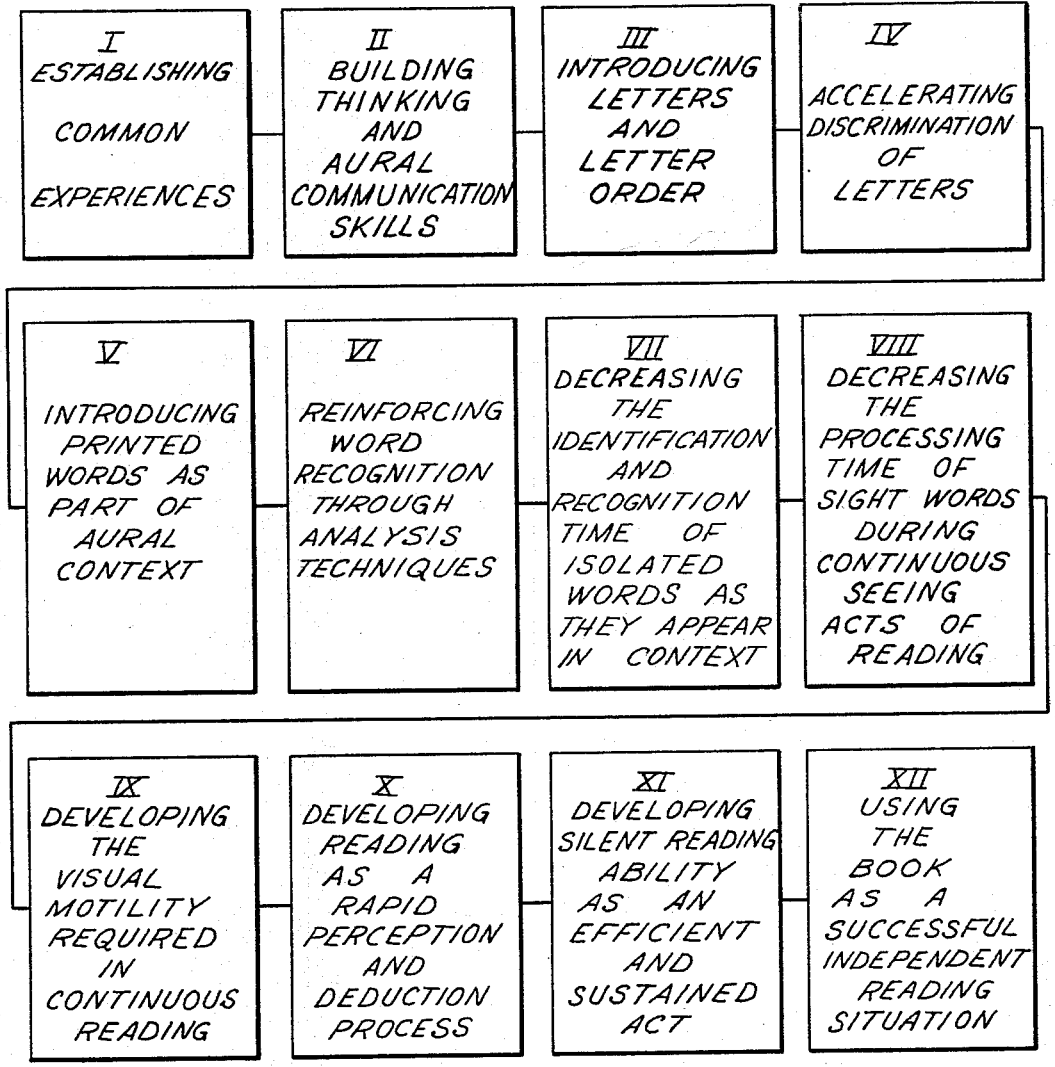
FIG. 1 is a flow sheet or diagram of a preferred educational or teaching sequence for use with audio-visual aids in teaching linguistic skills.

In FIG. 1 I have shown a flow diagram of a preferred educational or teaching sequence for use with audio and visual aids in teaching linguistic skills. Each step or phase of the sequence is represented by a separate block. In all, I have shown twelve steps or phases identified by Roman numerals from I to XII.

Step or phase I constitutes establishing common experience, and this is discussed more fully under a corresponding heading and is illustrated in part in FIG. 2.

Step or phase II constitutes building, thinking and aural communication skills. This is discussed more fully under a corresponding heading.

Step or phase III consists of introducing letters and letter order. This is discussed more fully under a corresponding heading and is illustrated in part in FIG. 3.

Step or phase IV consists of accelerating discrimination of letters. This is discussed more fully under a corresponding heading and is illustrated in part in FIG. 4.

Step or phase V consists of introducing printed words as a part of aural context. This is discussed more fully under a corresponding heading and is illustrated in part in FIG. 5.

Step or phase VI consists of reinforcing word recognition through analysis techniques. This is also discussed more fully under a corresponding heading.

Step or phase VII consists of decreasing the identification and recognition time of isolated words as they appear in context. This is discussed more fully under a corresponding heading and is illustrated in part in FIG. 6.

Step or phase VIII consists of decreasing the processing time of sight words during continuous seeing acts of reading. This is discussed more fully under a corresponding heading and is illustrated in part in FIG. 7.

Step or phase IX consists of developing the visual motility required in continuous reading. This is discussed more fully under a corresponding heading and is illustrated in part in FIG. 8.

Step or phase X consists of developing reading as a rapid perception and deduction process. This is discussed more fully under a corresponding heading and is illustrated in part in FIG. 9.

Step or phase XI consists of developing silent reading ability of the child as an efficient and effective sustained act. This is discussed more fully under a corresponding heading.

Step or phase XII is the final phase of the sequence and consists of using the book as a successful, independent reading situation.

It should be understood that portions only of the sequence may be employed to develop or reinforce certain of the component skills. Thus, where aural communication skills and letter order and words have been taught, the partial sequence of steps V through VIII can be stressed and repeated as required. After word recognition and identification has been adequately taught, and the recognition and processing time has been sufficiently decreased, visual motility can thereafter be suitably developed as by the portion of the sequence represented by steps IX to XII.

In a teaching sequence involving all of the steps or phases from I to XII, any one or more steps thereof can be recycled or repeated as many times as required.

Each of the separate steps or phases of the teaching sequence will now be considered under separate headings.

(I) *Establishing common experience*

The primary purpose of this step or phase is to expose the child or pupil to experiences and concepts which are to provide a basis for the communication experiences to follow. This may be accomplished in the manner indicated in FIG. 2 using primary audio-visual media, such as films and recordings. Thus, I have illustrated a rear projection screen 10 on which a sound, moving picture film is projected. The films should display simulated living experiences, stressing daily living problems involving communication skills. The sound and visual image are coordinated in the proper fashion. Thus, the "looking" and listening situation causes the child to employ various types of thinking skills and to realize the role of aural communication. In phase I, little or no specific attention is directed to the specific function of aural or printed words on the part of the child. The primary concern lies with the experiences and concepts which are to provide a base for the communication experiences to follow. Thus, the film may display a sequence in which a child goes to a store, makes a purchase, and receives the incorrect amount of change. As a further example, the film may display a sequence in which the child moves from one neighborhood to another and meets with his new neighbors and must transfer to a new school.

(II) *Building thinking and aural communication skills*

This step or phase develops the child's ability to look, to listen, and to think with competence. Filmstrip stills, frames taken from the films of phase I, are projected on a screen or excerpts from the sound track of the recordings used in phase I are played so as to serve as the stimulus for small group discussion activities. In these discussions, the child or pupil is stimulated to recall, to order, and organize, to interpret and relate, and to evaluate and apply in oral terms. Attention centers on the child's ability to use a variety of thinking skills and to communicate his ideas clearly, systematically and directly. All instructional materials are presented in the form of pictures or sound with no use of printed words. Thus, the child's ability to look and to listen with competence is developed. Visual and auditory discrimination and the looking and listening skills vital to learning are stressed during this phase.

(III) *Introducing letters and letter order*

In this phase, letters are taught through a variety of discrimination activities, such as copying, typing, or printing. By similar procedures, the child is taught that a word represents a sequence of letters. In this connection, a tachistoscopic device and projector, such as disclosed in Patent No. 2,723,591, and as indicated in FIG. 3, may be used to first display individual letters one to a line at increasing rates of speed to make letter recognition instantaneous, later to present several letters to a line to teach letter order. A tachistoscope is a device or apparatus for exposing figures, letters, words, images, or other visual stimuli for very brief periods of time in the order of a fraction of a second. In FIG. 3, a tachistoscopic projector is shown at 12 projecting the letter K on a screen as shown at 14. A typical sequence of letters is indicated at 15 and these letters singly or in combination are projected one line at a time in sequential relationship on the screen. Each letter may be displayed for a relatively short period of time in the order of .33 second initially and the period of time for each letter displayed may be decreased so as to make letter recognition instantaneous.

(IV) *Accelerating discrimination of letters*

In this phase, the child is taught to discriminate between letters displayed in a sequence. Thus, lines of letters are presented in a left-to-right manner with a projector of the type which projects an image of a line of letters on the screen, uncovering them on the screen, from left to right. For this purpose, a projector of the type shown in Patent No. 2,745,313 may be employed. In FIG. 4, I have illustrated a projector 16 of this type displaying individual lines of letters from left to right on a screen as indicated at 18. A typical sequence of lines of letters is shown at 20. These lines of letters are projected one at a time and are scanned from left to right.

In this step or phase, the child may count previously designated letters, such as the d's or the g's from the exercise, or he may look for letters in order as they occur in the alphabet. From training exercise to exercise, the number of letters per line is increased (reducing the spaces between the letters) and the rate of scanning from left to right is similarly increased. Thus, the child is taught to maintain a high level of attention during careful scrutiny in a dynamic act that approximates the activity of reading. In this fashion, the child is encouraged to fixate systematically across each line of letters and during each fixation to recognize, to identify, and to discriminate between the letters in a left-to-right order. The ultimate effect of this training is to create a more stable letter recognition while under the effects of the usual reading situation in which there is constant overlap of retinal impressions and the disturbance of the oculo-motor activity.

(V) Introducing printed words as part of aural context

In this phase, the child is introduced to new printed words through an inductive learning process. Thus, through the use of an audio aid, such as a disc or tape record player, linguistic sequences, such as recorded stories or other aural contexts consisting of at least a sentence, are completed. In the midst of the aural context, the visual image of selected words in the linguistic sequence are visually presented one at a time by projecting them on a screen in conjunction with the production of the sound. The visual image of each selected word is produced just prior to the sound of the word. The visual image and the sound are then continued simultaneously and they are simultaneously terminated at the end of the sound of the word to thereby teach indirectly the relationship of aural vocabulary with printed words. This is diagrammatically illustrated in FIG. 5 which shows a tape player 24 and a rear projection screen 26 on which the images of the selected words are projected. The linguistic sequence or aural context is shown beneath the tape player and screen and the words appearing beneath the blank spaces are the selected words whose images are presented one at a time on the screen. The box surrounding the selected words represent the relative length of time through which the images are projected, and it will be noted that the image is produced prior to the sound of the word and terminates simultaneously therewith. In this way, a child is introduced to new printed words through an inductive learning process in which he finds it easy to associate various spoken words with unknown printed words. Later, in the use of this step or phase, the selected words are omitted from the aural context and they are projected on the screen during pauses in the narration. In this way, the child is encouraged to recognize, and use, the printed word in order to complete the continuity of thought and meaning being aurally presented. This mode of presentation of aural context with intermittent but integrally visual word presentations has a number of advantages over the printed page in initiating a sight vocabulary in beginning reading. For example:

(a) The linguistic sequence in which the word appears is easily realized by the child and thus the function and meaning of the word is more evident.

(b) The stories used can be considerably higher in readability level, more interesting and more usual linguistically to the child because they are not subject to the same restricting vocabulary controls exercised in creation of printed beginning reading materials.

(c) The aural communication read to the child can be kept at a higher level (125–200 words per minute), which is his usual speaking and listening rate but one which is considerably higher than the reading rate usually accomplished by beginning readers. This higher rate will encourage the child to be more rapid in his association and will preserve and encourage rather than stifle the thought processes the child has developed to that point and which he brings to the reading act.

(d) By isolating words graphically rather than presenting them in the usual printed context of a phrase or line, all the conflicting retinal impressions that would be created by the "other" words as the child wanders over the line in a manner habitual to ineffective readers is avoided.

(e) At no time is the child permitted to regress to prior words or context. He is presented with aural and visual context that is direct and sequential.

(f) The presentation of aural context in which individually selected words appear first by way of visual image, followed immediately thereafter with the sound of the word, and with the sound and the image terminating simultaneously as part of a linguistic sequence serves to encourage and reinforce the recognition of new words and to teach indirectly the relationship of aural vocabulary with printed words.

(VI) Reinforcing word recognition through analysis techniques

The recognition of words which have been previously taught, particularly in phase V, is reinforced in this phase of the sequence. Thus, the images of phonetically and structurally or graphically related groups of words are also produced in conjunction with aural instructions or directions. Likewise, the images and the sound may, at times, be presented in a synchronized manner preferably with the same coordination of visual image and sound as in step or phase V and using the audio-visual apparatus of the type indicated in FIGS. 5 and 6. This phase of the sequence is not concerned with timing, but is simply concerned with the presentation of words in phonetically and structurally related groups with directions and instructions and responses that will increase the student's insight into the principles of independent word analysis and to more closely associate the sound of a word with its image. At other times as aural response is requested of the student, with the correct aural response suggested, and as the student responds a reinforcing image will appear in synchronization in order to aid the child in associating a kinesthetic response required to produce the word with its image. At times the student will, in the process of responding, record an aural response as evidence of his learned ability to analyze and recognize words.

(VII) Decreasing the identification and recognition time of isolated words as they appear in context Recorded stories or other linguistic sequences forming part of an aural context are played on a tape or record player and selected words are omitted from the aural context and are presented by means of a tachistoscopic projector on a screen, as diagrammatically illustrated in FIG. 6. Thus, the linguistic sequence or aural context is played on a tape player 28 and the words omitted from the aural context are presented on screen 38 by means of a tachistoscopic projector 32, which projects selected words at increasing rates of speed of between .33 and .01 second, thereby decreasing the identification and reaction time for these words. The ultimate goal is to transform all words whose meaning is known into sight words, which by definition refers to words recognizable in less than the usual eye phase in reading.

In the recognition of words in phase V, the child has sufficient exposure time to employ several fixations during the process of identifying and recognizing a word. In phase VII, the "flashed" images from the tachistoscopic projector permit recognition during only one brief fixation, one visual impression at a peak of attention and so the child is encouraged to grow in his discrimination ability and in the visual memory he employs to retain a word. Thus, the child listens, guesses the missing word by using context clues, and then watches the screen for the flashed word for correction or verification. Later the flashed words can be filled into blanks in a printed story. Through these contextural exercises, the child also experiences the role meaning plays in suggesting and vertifying certain words.

(VIII) Decreasing the processing time of sight words during continuous seeing acts or reading In this phase the words (only those introduced to date) of a short story are visually presented as by means of a projector on a screen, one word to a whole line in the same general location from line to line. The words are thus presented successively until they complete a linguistic sequence, such as a sentence or paragraph. This is diagrammatically illustrated in FIG. 7, in which the projector is shown at 34 and the screen at 36. The sequence of words which are thus projected one at a time are diagrammatically indicated at 38. The presentation time per word will be decreased during training exercises from approximately .33 to .10 second. In this phase, the child is expected to identify, recognize and to associate meaning in a rapid and continuous manner as in reading but with the following differences:

(a) During this training, the child still receives only a single impression of each word. At no time will he be permitted more than a single eye-stop or fixation per word. As a consequence, the child is given training in processing or "securing" his impression more quickly and soon learns to tolerate the overlap retinal impressions that is typical of continuous reading.

(b) Though each word is isolated graphically, each appears in the same place on the projection slide or screen in rapid succession, affording the training to be derived from the constant overlapping of impressions.

(c) He will have the advantage of a direct and orderly presentation of words, for they will be exposed to him in proper succession. There will be no possibility of regressing or rereading.

If the child needs additional "exposure" for recognition and understanding, the film would be repeated at the same high rate rather than slowing down the presentation time in order to maintain the perceptual training.

This form of training is easier for the student to accept because another complexity of continuous reading, i.e., saccadic movement, is not present because the words are presented one at a time and one to a line at a high presentation rate which does not permit the usual eye movement.

The partial sequence of steps or phases V through VIII may be used to advantage with students in whom recognition and identification of letters and of letter sequences have been developed. These steps will serve to develop and reinforce identification and recognition of words both individually and as part of a linguistic sequence and will serve further to decrease the time required for such identification, recognition, and association. When word identification, recognition, and association have been properly and reinforced, the teaching sequence can then return to the conventional left-to-right reading intake process typical of the conventional act of reading. A partial sequence for developing left-to-right reading skills is embodied in phases IX through XII.

(IX) Developing the visual motility required in continuous reading

In this phase, numbers, letters, symbols, or words comprising a linguistic sequence, such as a story, are presented, two or three elements to a line and rapidly from left to right by means of a suitable visual aid. Thus, as shown diagrammatically, in FIG. 8, a projector 40 which projects images sequentially from left to right on a single line may be utilized to project successive lines comprising symbol exercises or words on a screen 42. The lines of symbols typical of the material presented from left to right are diagrammatically shown at 44. The lines are scanned in a left-to-right manner at a rate of presentation ranging from 1.2 seconds per line (50 lines per minute and 100 words per minute if 2 words are presented per line) to .40 second (125 lines per minute—250 words per minute if 2 words per line are presented). These rates of presentation provide the child with just enough time to make a predetermined two or three eyestops or fixations per line, allowing a range of from .40 second per eyestop to .20 second per eyestop. As the child strives to reach a satisfactory vantage point at each point of the line from which to view each symbol or word and sufficient time in order to identify and recognize, he learns to direct his eyes more quickly with greater precision and coordination, and with greater ease, thus developing the visual functional facility or ocular motility vital to comfortable and fluent silent reading. While this step or phase is shown as following step or phase VIII, it may be used with advantage after one or more of steps V, VI, VII, or VIII.

(X) Developing reading as a rapid perception and deduction process

In this step or phase of the sequence, many of the preceding skills are combined and put to use. Linguistic sequences, such as a story or a portion of a story are exposed, by means of a visual aid, one line at a time and in a left-to-right manner in conventional reading, while being projected on a screen in the manner shown in FIG. 9. Thus, in FIG. 9, is shown a projector 46 which can project one line at a time from left-to-right on a screen 48. The sequence of lines making up a portion of the story are shown diagrammatically at 50. After each segment, such as a sentence or paragraph, is exposed, the projector is stopped and the children discuss the content of whatever they have seen projected on the screen.

These intensive readings "bursts" put to use the motility, the perceptual processing ability, and the associational skills previously learned. The questions and discussions that follow each segment (a sentence or paragraph) develop the child's ability to arrive at word meanings, to take careful note of what was stated as well as realize what was implied, to sense the structure of language, to associate the facts and information presented with personal experience, to interpret and evaluate the information given, and to anticipate what might follow. The dual goal of this combined training is to stimulate the child to read more rapidly while reading more intensively.

(XI) Developing silent reading ability as an efficent and sustained act

During this step or phase, the child learns to read linguistic sequences such as stories (using known words) for continuous sustained periods (of four to five minutes or more) using a visual aid to expose one line at a time from left to right. For this purpose, I may employ a visual aid such as a projector in a manner similar to that illustrated in FIG. 9 by projecting the individual lines of the sequence on a screen from left to right. Thus, reading training is provided in which the child's visual motility, his perceptual processing ability, his word knowledge, his association skills, and his organization approaches are all utilized in sustained, timed, and directionally controlled reading situations.

Instead of stopping the projector after each sentence or paragraph as in step X, the linguistic sequence is projected or exposed line by line and from left to right for sustained periods of four to five minutes or more. More effective and efficient habits of reading are developed by repeating and continuing this practice with sufficient frequency per week and for a given total number of sessions. Thus, in reading, the child will habitually require less fixation or eyestops to perceive words, and will need less regressions or rereadings to insure accuracy and will require less time to react to the meaning of words and to associate meanings. As a consequence, the child will ultimately find himself able to read with greater ease and fluency in a manner he can sustain for longer periods of time, and in a manner perceptually that will permit and encourage maximum comprehension and utilization of context.

(XII) Using the book as a successful independent reading situation

After the child has had adequate training in the steps of the foregoing sequence, he is ready to turn to the book. Thus, if each step in the sequence has been adequately pursued and recycled where necessary, the child will have acquired the necessary experience and concepts, the thinking skills, the necessary number of sight words along with the ability to quickly and easily identify, recognize, and associate these words with meaning as part of an efficient performing-thinking process that will yield maximum comprehension and interpretation. By providing adequate preparation of reading skills away from the book and then exposing the child to books only when he makes the best use of them, reading and books will soon come to be regarded by the child as an enjoyable and rewarding experience.

A library paralleling the growth of sight vocabulary and concept development should be available so as to provide each child with highly successful and motivating independent reading situations throughout his "learning to read" career.

It will thus be seen that I have provided an improved method of teaching linguistic skills using audio-visual aids wherein the student's letter awareness, word identification and recognition, and understanding and use of words and word sequences is quickly developed and wherein his speed in employing these skills is readily increased and accelerated. While I have developed a complete sequence of steps or phases to develop and reinforce all of these skills, any one or more of these steps may be separately utilized and recycled where only certain skills are to be developed or reinforced.

Specific modifications may be made in my method and in the individual steps thereof as for instance by utilizing different audio and visual aids in connection therewith.

I claim:

The method of teaching linguistic skills using audio-visual aids which comprises: producing the sounds of words in a linguistic sentence sequence; displaying a visual image of a random word in said linguistic sequence, the production of the sound of said random word commencing shortly after the initiation of the visual image of said word; continuing the image display with the sounding of said word and terminating said display and said word sounding substantially simultaneously to thereby teach the recognition of said random word.

References Cited by the Examiner

UNITED STATES PATENTS

| | | | |
|---|---|---|---|
| 2,723,591 | 11/1955 | Taylor | 35—35.2 X |
| 2,745,313 | 5/1956 | Taylor | 35—35.2 X |
| 2,975,672 | 3/1961 | Shields. | |
| 3,078,593 | 2/1963 | Miller | 35—35.3 X |

EUGENE R. CAPOZIO, *Primary Examiner.*

W. GRIEB, *Assistant Examiner.*